(12) United States Patent
Eto

(10) Patent No.: US 6,544,893 B2
(45) Date of Patent: Apr. 8, 2003

(54) METHOD OF MANUFACTURING A GLASS SUBSTRATE FOR AN INFORMATION RECORDING MEDIUM, AND METHOD OF MANUFACTURING AN INFORMATION RECORDING MEDIUM

(75) Inventor: Nobuyuki Eto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/537,185

(22) Filed: Mar. 29, 2000

(65) Prior Publication Data

US 2002/0061603 A1 May 23, 2002

(30) Foreign Application Priority Data

Mar. 30, 1999 (JP) .......................................... 11-090307

(51) Int. Cl.[7] ............................................ H01L 21/302
(52) U.S. Cl. ...................... 438/693; 438/692; 438/691; 428/141
(58) Field of Search .................... 428/64, 410, 426, 428/141, 915; 430/270, 290, 495, 945; 369/288, 284; 438/693, 691, 692, 690, 299

(56) References Cited

U.S. PATENT DOCUMENTS

| 5,224,090 A | * | 6/1993 | Umeda et al. ............... 369/284 |
| 5,654,057 A | * | 8/1997 | Kitayama et al. .......... 428/64.1 |
| 5,681,609 A | * | 10/1997 | Kitayama et al. ........... 427/129 |
| 5,725,625 A | * | 3/1998 | Kitayama et al. ............. 65/30.1 |
| 5,916,656 A | * | 6/1999 | Kitayama et al. .......... 428/64.1 |
| 6,096,405 A | * | 8/2000 | Takahashi et al. .......... 428/141 |

* cited by examiner

Primary Examiner—Carl Whitehead, Jr.
Assistant Examiner—Laura Schillinger
(74) Attorney, Agent, or Firm—Sughrue Mion, PLLC

(57) ABSTRACT

On manufacturing a glass substrate for an information recording medium, after a principal surface of the glass substrate is polished, sulfuric acid-cleaning of the principal surface is carried out so that the glass substrate has surface roughnesses Ra and Rmax satisfying Ra=0.1–0.7 nm and Rmax/Ra<20 as measured by an inter-atomic force microscope (AFM), where Ra is representative of a center-line-mean roughness and where Rmax is defined as a maximum height representative of a difference between a highest point and a lowest point.

18 Claims, 2 Drawing Sheets

METHOD OF MANUFACTURING A GLASS SUBSTRATE FOR AN INFORMATION RECORDING MEDIUM, AND METHOD OF MANUFACTURING AN INFORMATION RECORDING MEDIUM

BACKGROUND OF THE INVENTION

This invention relates to a method of manufacturing an information recording medium for use as a recording medium for an information processing apparatus, and a substrate therefor.

A magnetic disk is known as one of information recording media of the type. The magnetic disk comprises a substrate and a thin film such as a magnetic layer formed thereon. As the substrate, use has been made of an aluminum substrate or a glass substrate. In recent years, in response to the demand for high-density recording, the glass substrate is used at an increasing ratio because a gap between a magnetic head and the magnetic disk can be small as compared with the aluminum substrate.

Generally, the glass substrate increasingly used as described above is manufactured through chemical strengthening in order to increase the strength so that the glass substrate is resistant against a shock when loaded into a magnetic disk drive. In addition, in order to lower a flying height of the magnetic head as low as possible, the surface of the glass substrate is polished with high precision. Thus, high-density recording is realized.

On the other hand, the magnetic head is developed from a thin film head to a magnetoresistive head (MR head), further to a giant (large-sized) magnetoresistive head (GMR head) so as to meet the high-density recording.

As described above, the flying height must be lowered to achieve the high-density recording. To this end, it is essential that the surface of the magnetic disk has a high flatness. In addition, in case where the MR head is used, the surface of the magnetic recording medium must have a high flatness also from a problem of thermal asperity. The thermal asperity is a phenomenon that, if the surface of the magnetic disk has an abnormal protrusion, the MR head is affected by the protrusion to generate heat on the MR head and the resistance of the head fluctuates due to the heat to cause operation error in electromagnetic conversion. In this invention, the abnormal protrusion is a protrusion having a protrusion height specified by a surface roughness Rmax which satisfies Rmax/Ra≧20 when another surface roughness Ra is on the order between 0.1 and 0.7 nm, where Rmax is defined as a maximum height representative of a difference between a highest point and a lowest point and where Ra is representative of a center-line-mean roughness which will later be described.

Thus, in order to lower the flying height and to prevent the occurrence of the thermal asperity, there is an increasing demand for a high flatness of the surface of the magnetic disk. In order to achieve such a high flatness of the surface of the magnetic disk, a substrate surface must have a high flatness. However, the development in technology has reached a stage in which the high density recording of the magnetic disk is no longer achieved only by polishing the substrate surface with high precision. In other words, even if the substrate is polished with high precision, a high flatness is not obtained in case where foreign matter is adhered to the substrate. In fact, the removal of the foreign matter has been carried out. At a recent level of the high-density recording, however, fine foreign matter on the substrate is a problem although it has been allowed previously.

On the other hand, the above-mentioned glass substrate having a high flatness is obtained through a polishing step using abrasive grains of cerium oxide and another polishing step using colloidal silica grains. Recently, it is revealed that the glass substrate for a magnetic disk is useful not only as a 2.5-inch glass substrate mounted on a hard disk of a notebook-type personal computer but also for a desktop-type personal computer. Therefore, a demand for 3-inch and 3.5-inch glass substrates is rapidly increasing. Under the circumstances, it is disadvantageous in an economical aspect to perform the polishing steps using the different abrasive grains. It is therefore required to provide a method of manufacturing a glass substrate, which is capable of in achieving a high flatness comparable to the prior art by the use of cerium oxide grains. However, the above-mentioned foreign matter is not ignorable after the polishing step by the use of the cerium oxide grains.

The foreign matter of the type can not be removed by a typical cleaning step (ultrasonic cleaning or scrub cleaning by a neutral detergent, water, IPA (isopropyl alcohol), or the like) following a precision polishing step using abrasive grains such as cerium oxide and providing a surface roughness Ra of 1.0 nm or less. The foreign matter has a protruding height (Rmax) on the order of 10 nm. The foreign matter of the type is produced as a result of the precision polishing step using the abrasive grains such as cerium oxide, and is believed to mainly comprise polishing residue (protrusion). There is a recent demand for a glass substrate with a ultraflat or ultrasmooth surface having a surface roughness of 3 nm or less as Rmax and 0.3 nm or less as Ra. In such a situation, the polishing residue mentioned above is a serious problem. In case where a thin film such as a magnetic film is deposited on the glass substrate with the polishing residue adhered thereto, a projecting portion is formed on the surface of the magnetic disk to inhibit the lowering of the flying height and the prevention of occurrence of the thermal asperity.

SUMMARY OF THE INVENTION

It is an object of this invention to prevent polishing residue of the type from being left on a glass substrate.

It is another object of this invention to manufacture an information recording medium at a high yield by the use of a glass substrate from which polishing residue as a film defect is removed.

Methods according to this invention are as follows.

(1) A method of manufacturing a glass substrate for an information recording medium, comprising the steps of:
 polishing a principal surface of the glass substrate; and
 carrying out, subsequently to the step of polishing the principal surface, sulfuric acid-cleaning of at least the principal surface so that the glass substrate has surface roughnesses Ra and Rmax satisfying Ra=0.1–0.7 nm and Rmax/Ra<20 as measured by an inter-atomic force microscope (AFM), where Ra is representative of a center-line-mean roughness and where Rmax is defined as a maximum height representative of a difference between a highest point and a lowest point.

(2) A method of manufacturing an information recording medium, comprising the step of forming at least a recording layer on the glass substrate for the information recording medium that is manufactured by the method as mentioned in the paragraph (1).

(3) A method of manufacturing a glass substrate for an information recording medium, comprising:
 a polishing step of polishing a principal surface of the glass substrate;

a chemical strengthening step of strengthening the glass substrate by replacing a part of ions contained in the glass substrate by substitute ions greater in ion-diameter than the part of ions; and a sulfuric acid-cleaning step of cleaning at least the principal surface with sulfuric acid after the polishing step and before the chemical strengthening step.

(4) A method of manufacturing an information recording medium, comprising the step of forming at least a recording layer on the glass substrate for the information recording medium that is manufactured by the method as mentioned in the paragraph (3).

(5) A method of manufacturing a glass substrate for an information recording medium, comprising the steps of:

polishing a principal surface of the glass substrate;

cleaning at least the principal surface with an alkaline cleaning solution subsequently to the step of polishing the principal surface; and cleaning at least the principal surface with sulfuric acid subsequently to the step of cleaning at least the principal surface with the alkaline cleaning solution, (6) A method of manufacturing an information recording medium, comprising the step of forming at least a recording layer on the glass substrate for the information recording medium that is manufactured by the method as mentioned in the paragraph (5).

(7) A method of manufacturing a glass substrate for an information recording medium, comprising the step of polishing a principal surface of the glass substrate, wherein:

the step of polishing the principal surface uses abrasive grains made of cerium oxide;

the method further comprising the step of cleaning at least the principal surface with sulfuric acid subsequently to the step of polishing the principal (8) A method of manufacturing an information recording medium, comprising the step of forming at least a recording layer on the glass substrate for the information recording medium that is manufactured by the method as mentioned in the paragraph (7).

DETAILED DESCRIPTION OF THE INVENTION

Hereinafter, description will be made about a method of manufacturing a glass substrate for an information recording medium according to this invention.

The method of manufacturing a glass substrate for an information recording medium according to this invention comprises the step of precision-polishing a principal surface of the glass substrate and is characterized in that the polishing step is followed by the step of cleaning the principal surface of the glass substrate with sulfuric acid.

Preferably, the sulfuric acid-cleaning of the principal surface is carried out so that the glass substrate has surface roughnesses Ra and Rmax satisfying Ra=0.1–0.7 nm and Rmax/Ra<20 as measured by an inter-atomic force microscope (AFM).

The surface roughness Ra is representative of a center-line-mean roughness defined in Japanese Industrial Standard JIS B0601. The center-line-mean roughness Ra will now be described with reference to FIG. 1.

Figure 1:
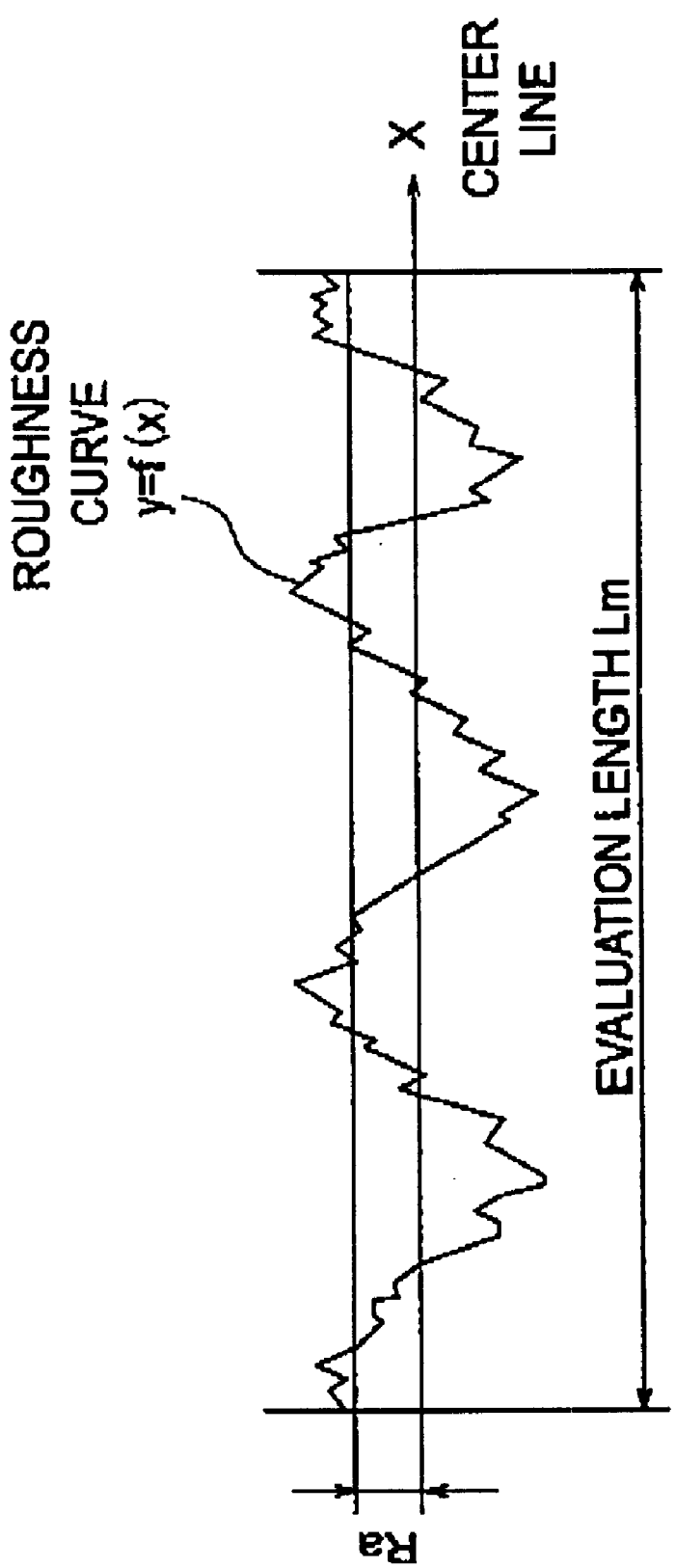
FIG. 1 shows a roughness curve for use in describing a center-line-mean roughness (Ra) used in this invention.

A portion having an evaluation length Lm is sampled from a roughness curve illustrated in FIG. 1 along a direction of a center-line of the roughness curve. The center-line-mean roughness Ra is represented by the following $$Ra = \frac{1}{Lm}\int_0^{Lm} |f(x)|\,dx,$$

where the roughness curve is represented by y=f(x) when the center line of the sampled portion is defined as the X axis and when the direction of vertical magnification is defined as the Y axis.

That is, the center-line-mean roughness Ra is defined as a value which is obtained by integrating an absolute value of deviation between the center-line and the roughness curve by the section of the evaluation length into an integrated value and by averaging the integrated value with the section. In other words, the center-line-mean roughness Ra is defined as an average value of an absolute value of deviation between the center-line and the roughness curve.

The surface roughness Rmax is a maximum height representative of a difference between a highest point and a lowest point of the surface as also defined in Japanese Industrial Standard JIS B0601.

By carrying out the sulfuric acid-cleaning after the polishing step, it is possible to effectively remove abrasion residue (protrusion) or the like produced (left) as a result of the polishing step. The abrasion residue of the type can not be removed by a typical cleaning step (ultrasonic cleaning or scrub cleaning with a neutral detergent, water, IPA, or the like).

Preferably, sulfuric acid used in the sulfuric acid cleaning has a concentration of 25 vol % or more. The sulfuric acid concentration less than 25 vol % is unfavorable because the effect of resolving and removing the polishing residue by sulfuric acid is weak so that an abnormal protrusion is difficult to remove. The sulfuric acid concentration is, more preferably 50% or higher, further preferably, 75% or higher. With an increase in sulfuric acid concentration, the cleaning effect is improved.

The temperature condition of the sulfuric acid cleaning is between 40° C. and the glass transition point, preferably, between 60° C. and 12° C. As the temperature of sulfuric acid is higher, the cleaning effect is improved.

Preferably, the sulfuric acid cleaning step is carried out during a production process of the glass substrate for an information recording medium, particularly, after the step of precision-polishing the principal surface to reduce a surface roughness Ra to a level not greater than 1.0 nm. This is because cerium oxide used in the precision-polishing step tends to cause the abrasion residue. It is noted here that, if the sulfuric acid cleaning step is carried out after any polishing step other than the precision-polishing step, the polishing residue is effectively removed.

In case where a chemical strengthening step is included, the sulfuric acid cleaning step is preferably carried out after the precision-polishing step of the principal surface and before the chemical strengthening step. This is because the abrasion residue (protrusion) in the precision-polishing step is resolved and removed by the sulfuric acid cleaning. If the chemical strengthening is carried out with the abrasion residue adhered to the glass substrate, foreign matter unnecessary in chemical strengthening is mixed with a chemical strengthening solution. In this event, the foreign matter is adhered to the glass substrate during the chemical strengthening to produce a film defect. If the precision-polishing is performed after the chemical strengthening step, it is preferable to carry out the sulfuric acid cleaning also after the precision-polishing following the chemical strengthening step.

Preferably, the sulfuric acid cleaning step is carried out in a wet condition immediately after the polishing step. This is because, if the sulfuric acid cleaning is performed in the wet condition immediately after the polishing step, the abrasion residue can be effectively removed since the above-mentioned abrasion residue is not yet dried to be firmly adhered.

In this invention, alkali pre-cleaning is preferably carried out before the sulfuric acid cleaning of this invention. By carrying out the alkali pre-cleaning, an abrasive agent used in the polishing step and adhered to the glass substrate can be dispersed so that the abrasive agent is efficiently removed by a slow etching effect. As a cleaning solution used in the alkali cleaning, use may be made of an alkaline aqueous solution, for example, an aqueous solution of sodium hydroxide, potassium hydroxide, or ammonia.

In this invention, abrasive grains used in the precision-polishing step of the principal surface may be cerium oxide, zirconium oxide, aluminum oxide, manganese oxide, colloidal silica, or the like. The sulfuric acid cleaning in this invention is particularly effective after the precision-polishing using cerium oxide as the abrasive grains.

In this invention, no restriction is imposed upon the kind, the size, and the thickness of the glass substrate. As a material of the glass substrate, use may be made of an aluminosilicate glass, a soda-lime glass, a soda aluminosilicate glass, an aluminoborosilicate glass, a borosilicate glass, a quartz glass, a chain-silicate glass, or glass ceramics of a crystallized glass.

Among others, use is preferably made of an aluminosilicate glass because a durability is relatively high and chemical strengthening is easy. Particularly, as the aluminosilicate glass, use is preferably made of a chemical strengthening glass essentially consisting of 58–75 wt % $SiO_2$, 5–23 wt % $Al_2O_3$, 3–10 wt % $Li_2O$, and 4–13 wt % $Na_2O$, a chemical strengthening glass containing 5–30 mol % $TiO_2$, 1–45 mol % CaO, 10 mol % MgO+CaO, 3–30 mol % $Na_2O+Li_2O$, 0–15 mol % $Al_2O_8$, and 35–60 mol % $SiO_2$, or the like. For the aluminosilicate glass of the above-mentioned compositions, the foreign matter can be removed by cleaning with hydrofluosilic acid (having an etching effect). However, the surface roughness of the glass is increased by such cleaning (etchning effect). Therefore, the sulfuric acid cleaning of this invention is adapted to the glass of the type. By chemical strengthening, the aluminosilicate glass of the above-mentioned compositions is increased in transversal rapture strength, increased in depth of a compressive stress layer, and excellent in Knoop hardness, In this invention, the surface of the glass substrate may be subjected to the chemical strengthening by a low-temperature ion exchange technique in order to improve shock resistance and vibration resistance. In order to perform the chemical strengthening, known chemical strengthening techniques may be used without any specific restriction. For example, use is preferably made of low-temperature chemical strengthening in which ion exchange is performed in a temperature range not exceeding the transition temperature in view of the glass transition point. As alkali molten salt used in the chemical strengthening, use may be made of potassium nitrate, sodium nitrate, or a nitrate mixture thereof.

During the chemical strengthening, the glass substrate is held by holding means which may take various forms. In any event, the holding means must allow the chemical strengthening solution to be in contact with the glass substrate in a predetermined condition and is preferably free from leakage of the solution.

The glass substrate for an information recording medium manufactured according to the above-mentioned method of this invention can be used as a glass substrate for a magnetic recording medium, a glass substrate for a magnetooptical disk, and an electrooptical disk substrate such as an optical disk. In particular, use is advantageously made as a magnetic disk substrate for a magnetoresistive head, on which recording/reproducing operations are carried out by the use of the magnetoresistive head (including a giant (large-sized) magnetoresistive head).

Next, description will be made about a method of manufacturing an information recording medium according to this invention.

The method of manufacturing an information recording medium according to this invention is characterized in that at least a recording layer such as a magnetic layer is formed on the glass substrate for an information recording medium obtained by this invention.

According to this invention, it is possible to prevent the above-mentioned polishing residue (protrusion) causing the thermal asperity or the head crash from being left on the glass substrate, particularly in the magnetic recording medium. Therefore, the magnetic recording medium comprising the glass substrate with the magnetic layer formed thereon can be manufactured at a high yield. Furthermore, the function of the magnetoresistive head can be fully exhibited. When used as an information recording medium having a CoPt layer advantageously used with the magnetoresistive head, its performance can be fully exhibited.

Likewise, on a recording/reproducing surface of the magnetic recording medium, it is possible to avoid the occurrence of a projecting portion formed by the above-mentioned polishing residue (protrusion) causing the thermal asperity and to avoid the head crash at a higher level.

It is also possible to prevent occurrence of a defect on a film such as a magnetic layer as a result of the above-mentioned polishing residue (protrusion) causing the thermal asperity and to prevent occurrence of an error resulting from such defect.

Generally, the magnetic recording medium comprises a magnetic-disk glass substrate which has a predetermined flatness and a predetermined surface roughness and which may be subjected to chemical strengthening of its surface, if necessary, and is manufactured by successively stacking an underlayer, a magnetic layer, a protection layer, and a lubricant layer on the substrate.

The underlayer in the magnetic recording medium is selected in dependence upon the magnetic layer.

For example, the underlayer comprises at least one material selected from nonmagnetic metals such as Cr, Mo, Ta, Ti, W, V, B, and Al, In case of a Co-based magnetic layer, a Cr element or a Cr alloy is preferable in view of the improvement of magnetic characteristics. The underlayer is not restricted to a single layer but may have a multilayer structure formed by a plurality of layers of a same kind or different kinds. For example, use may be made of a multi-layered underlayer such as Cr/Cr, Cr/CrMo, Cr/CrV, CrV/CrV, NiAl/Cr, NiAl/CrMo, NiAl/CrV, or the like.

The material of the magnetic layer in the magnetic recording medium is not particularly restricted.

For example, the magnetic layer may comprise a Co-based magnetic thin film such as CoPt, CoCr, CoNi, CoNiCr, CoCrTa, CoPtCr, CoNiPt, CoNiCrPt, CoNiCrTa, CoCrPtTa, or CoCrPtSiO. The magnetic layer may have a multilayer structure (for example, CoPtCr/CrMo/CoPtCr, CoCrPtTa/CrMo/CoCrPtTa) formed by dividing a magnetic film by a nonmagnetic film (for example, Cr. CrMo, or CrV) to reduce a noise.

The magnetic layer adapted to the magnetoresistive head (MR head) or the giant magnetoresistive head (GMR head) may comprise a Co alloy and an impurity element selected from Y, Si, a rare earth element, Hf, Ge, Sn, and Zn or oxide of the impurity element.

Besides, the magnetic layer may have a granular structure comprising a nonmagnetic film made of ferrite, an iron-rare earth alloy, $SiO_2$, BN, or the like with magnetic particles such as Fe, Co, FeCo, CoNiPt dispersed therein. The magnetic layer may be of either an in-plane or a vertical recording type.

The protection layer in the magnetic recording medium is not particularly restricted.

For example, the protection layer may comprise a Cr film, a Cr alloy film, a carbon film, a zirconia film, or a silica film. Such protection film can be formed by an in-line sputtering apparatus together with the underlayer and the magnetic layer in a continuous manner. The protection film may be a single layer or may have a multilayer structure comprising a plurality of films of a same kind or different kinds.

In this invention, another protection layer may be formed on the above-mentioned protection layer or instead of the above-mentioned protection layer. For example, instead of the above-mentioned protection layer, a silicon oxide ($SiO_2$) film may be formed by coating a Cr film with tetraalkoxysilane diluted by an alcoholic solvent with colloidal silica fine particles dispersed therein and by baking or sintering the same.

The lubricant layer in the magnetic recording medium is not particularly restricted.

For example, the lubricant layer is formed by diluting perfluoropolyether as a liquid lubricant with a Freon-based solvent, applying the lubricant on the surface of the medium by the dipping method, the spin coating method, or the spraying method, and, if necessary, carrying out heat treatment.

Now, this invention will be described more in detail in conjunction with specific embodiments.

Embodiment 1

(1) Roughing Step

At first, a sheet glass was formed by a down drawing technique and an aluminosilicate glass substrate was cut out therefrom by the use of a grindstone into a disk shape having a diameter of about 100 mm Φ and a thickness of 3 mm. The glass substrate was ground by a relatively rough diamond grindstone into a shape having a diameter of about 100 mm Φ and a thickness of 1.5 mm.

Instead of the down drawing technique, a molten glass may be subjected to direct press using an upper die, a lower die, and a body die to obtain a disk-shaped glass body. Alternatively, a floating technique may be used.

As the aluminosilicate glass, use was made of a chemically reinforcing glass essentially consisting 58–75 wt % $SiO_2$, 5–23 wt % $Al_2O_3$, 3–10 wt % $Li_2O$, and 4–13 wt % $Na_2O$ (for example, an aluminosilicate glass consisting of 63.5 wt % $SiO_2$, 14.2 wt % $Al_2O_3$, 10.4 wt % $Na_2O$, 5.4 wt % $Li_2O$, 6.0 Wt % $ZrO_2$, 0.4 wt % $Sb_2O_3$, and 0.1 wt % $As_2O_3$).

Next, opposite surfaces of the glass substrate were ground one at a time by the use of a diamond grindstone having a smallar grain size than that of the above-mentioned grindstone. At this time, the load on the order of 100 kg was applied. Thus, the opposite surfaces of the glass substrate were finished to have a surface roughness Rmax of the order of 10 μm.

Then, by the use of a cylindrical grindstone, a hole having a diameter of 25 mm Φ was formed at the center of the glass substrate. In addition, an outer peripheral end face was ground to reduce the diameter to 95 mm Φ. Thereafter, the outer peripheral end face and an inner peripheral surface were subjected to predetermined chamfering. At this time, the end face of the glass substrate had a surface roughness on the order of 4 μm as Rmax (2) End Face Mirror Finishing Step Next, the glass substrate was rotated and the end face of the glass substrate was polished by the use of a brush to have a surface roughness on the order of 1 μm as Rmax and 0.3 μm as Ra.

After completion of the end face mirror finishing, the surface of the glass substrate was cleaned with water, (3) Lapping Step Next, the glass substrate was subjected to lapping. The lapping step is intended to improve the dimensional accuracy and the shape accuracy. The lapping was performed by the use of a lapping apparatus two times with grains of different grain sizes of #400 and #1000, respectively.

Specifically, alumina grains having a grain size of #400 were used first. Under the load L set at about 100 kg, an inner gear and an outer gear were rotated to lap the opposite surfaces of the glass substrate received in a carrier so as to obtain the profile irregularity between 0 and 1 μm and the surface roughness (Rmax) on the order of 6 μm.

Thereafter, lapping was carried out with different alumina grains having a grain size of #1000 to obtain the surface roughness (Rmax) on the order of 2 μm.

After the above-mentioned sand blasting, the glass substrate was immersed successively in a neutral detergent and water in respective cleaning tanks to be cleaned.

(4) First Polishing Step

Next, a first polishing step was performed. The first polishing step is intended to remove scratches and distortion left by the above-mentioned sand blasting step and was carried out by the use of a polishing apparatus.

Specifically, the first polishing step was carried out by the use of a hard polisher (cerium pad MHC15 manufactured by Speedfam) as a polisher (polishing powder) under the following polishing condition.

Polishing Solution: cerium oxide (grain size of 1.3 μm) (free grains) +water

Load: 300 g/cm$^2$ (L=238 kg)

Polishing Time: 15 minutes

Removed Amount: 30 μm

Rotation Speed of Upper Surface Plate: 40 rpm

Rotation Speed of Lower Surface Plate: 35 rpm

Rotation Speed of Inner Gear: 14 rpm

Rotation Speed of Outer Gear: 29 rpm

After completion of the above-mentioned first polishing step, the glass substrate was immersed successively in a neutral detergent, pure water, pure water, IPA (isopropyl alcohol), and IPA (steam drying) to be cleaned.

(5) Second Polishing Step

Then, a second polishing step was performed by the use of the polishing apparatus used in the first polishing step with the polisher changed i—from the hard polisher into a soft polisher (politex manufactured by Speedfam). The second polishing step is intended to reduce tee surface roughness Ra, for example, to a level not greater than 1.0–0.3 nm while the flat surface obtained by the above-mentioned first polishing step is maintained. The polishing condition was similar to that of the first polishing step except that the polishing solution was cerium oxide (grain size of 1.0 μm)+water, the load was 100 g/cm², the polishing time was 5 minutes, and the removed amount was 5 μm.

(6) Sulfuric Acid Cleaning

Then, the glass substrate was cleaned with concentrated sulfuric acid (96%) kept at a temperature of 60° C. to resolve and remove the polishing residue (protrusion) left by the cerium oxide polishing. The sulfuric acid cleaning was carried out by immersing (about 6 minutes) a plurality of glass substrates in sulfuric acid contained in a cleaning tank. Thus, by removing the polishing residue (protrusion) prior to chemical strengthening as a next step, a film defect can be avoided. Particularly, it is important to carry out the sulfuric acid cleaning prior to the chemical strengthening. Specifically, if the chemical strengthening is carried out in a state that the polishing residue left by the cerium oxide polishing is adhered onto the glass substrate, foreign matter unnecessary to the chemical strengthening is mixed into the chemical strengthening solution. During the chemical strengthening, the foreign matter is adhered to the glass substrate to produce the film defect. Occurrence of such film defect can be avoided by the above-mentioned sulfuric acid cleaning.

After completion of the above-mentioned sulfuric acid cleaning, the glass substrate was cleaned. This cleaning step means precision cleaning and is intended to remove contamination by organic components and various particles adhered to the glass substrate. The process from this cleaning step to packaging into a case was performed under the environment of clean air supplied by a clean booth. The first cleaning was performed by immersing the glass substrate successively in a neutral detergent, a neutral detergent, pure water, pure water, IPA (isopropyl alcohol), and IPA (steam drying) in respective cleaning tanks. Each cleaning tank was applied with ultrasonic waves.

(7) Chemical Strengthening Step

Then, the glass substrate after completion of the cleaning step was subjected to chemical strengthening. The chemical strengthening was performed by filling a chemical strengthening tank with a chemical strengthening solution and immersing the glass substrate held by a holding member into the chemical strengthening solution. The holding member for holding the glass substrate comprises three columns with a plurality of V grooves formed at a predetermined space along an arrangement direction of the glass substrates, and coupling members connecting these columns at their both end faces. The glass substrates are held so that each glass substrate is three-point supported by the V grooves of the three columns in a same plane, and are arranged in an extending direction of the columns.

In this embodiment each of the columns and the coupling members of the holding member is made of austenitic stainless steel SUS316 which is excellent in anticorrosion characteristic in a high temperature range required upon the chemical strengthening. The chemical strengthening tank is made of austenitic stainless steel SUS304. The chemical strengthening tank and the holding member may be made of a same material or different materials. As another stainless steel, use is advantageously made of SUS316L for example. Since the chemical strengthening solution in this embodiment circulates through a filter, the chemical strengthening solution is kept clean.

In detail, the chemical strengthening was performed by preparing the chemical strengthening solution comprising a mixture of potassium nitrate (60%) and sodium nitrate (40%), heating the chemical strengthening solution to 400° C., and immersing the glass substrate cleaned and preheated to 300° C. into the solution for about 3 hours. In order to chemically strengthen an entire region of each surface of the glass substrate during immersing, the glass substrates were held by the holding member at their end faces.

Thus, by immersing into the chemical strengthening solution, lithium ions and sodium ions in a surface layer of the glass substrate were replaced by sodium ions and potassium ions in the chemical strengthening solution, respectively, so that the glass substrate was strengthened.

A compressive stress layer formed on the surface layer of the glass substrate had a thickness between about 100 and about 200 μm.

After completion of the above-mentioned chemical strengthening, the glass substrate was immersed in water kept at 20° C. to be quenched, and held for about 10 minutes. In this manner, defective products with small cracks can be removed, For the glass substrate obtained through the above-mentioned steps, the surface roughness of the principal surface was measured by the use of an inter-atomic force microscope (AFM). As a result, surface roughnesses Rmax, Ra, and Rq were equal to 2.81 nm, 0.24 nm, and 0.30 nm, respectively.

Furthermore, the glass surface was thoroughly examined. As a result, any abnormal protrusion causing the thermal asperity was not observed.

The surface roughness Rq is representative of a root-mean-square roughness defined in Japanese Industrial Standard JIS B0601. The root-mean-square roughness Rq will now be described with reference to FIG. 2.

Figure 2:
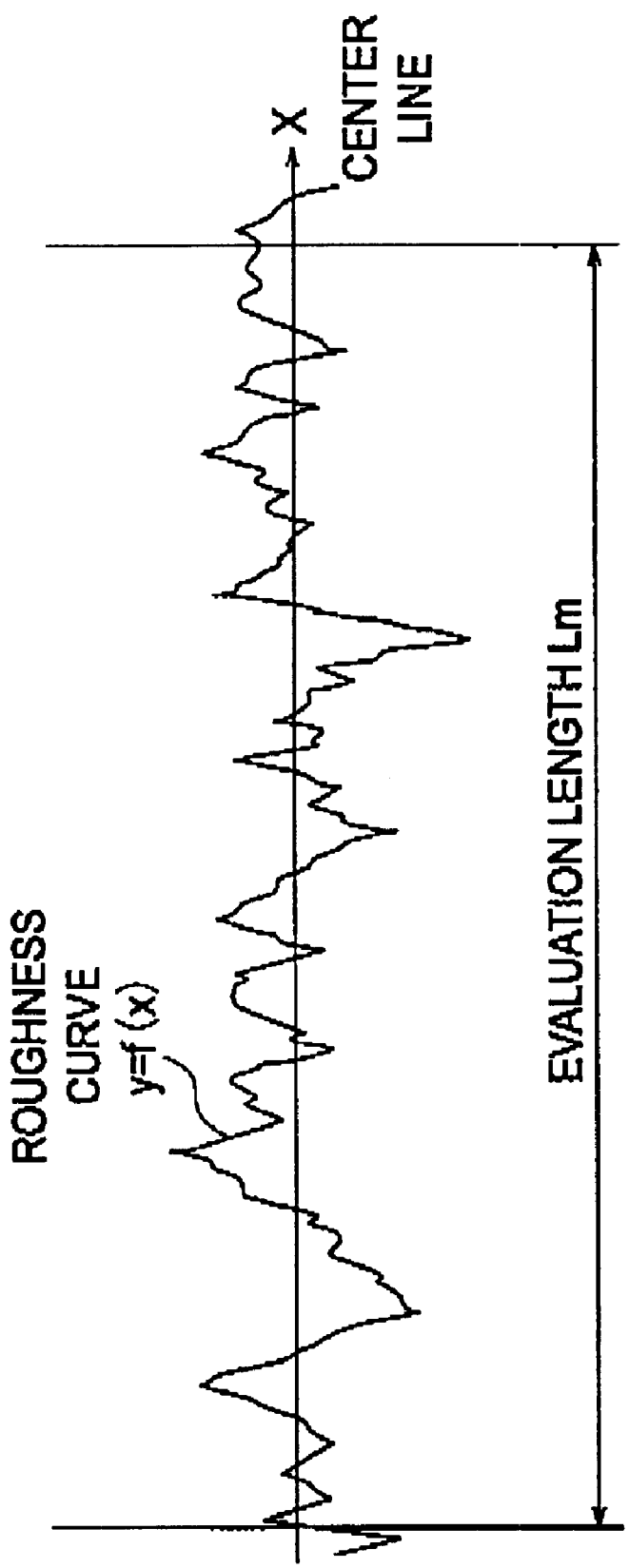
FIG. 2 shows another roughness curve for use in describing a root-mean-square roughness (Rq) used in this invention.

A portion having an evaluation length Lm is sampled from a roughness curve illustrated in FIG. 2 along a direction of a center-line of the roughness curve. The root-mean-square roughness Rq is represented by the following equation:

$$Rq = \sqrt{\frac{1}{Lm} \int_0^{Lm} f(x)^2 dx},$$

where the roughness curve is represented by y=f(x) when the center line of the sampled portion is defined as the X axis and when the direction of vertical magnification is defined as the Y axis.

That is, the root-mean-square roughness Rq is defined as a square root of a value which is obtained by integrating the square of deviation between the center-line and the roughness curve by the section of the evaluation length into an integrated value and by averaging the integrated value with the section. In other words, the root-mean-square roughness Rq is defined as an square root of an average value of the square of deviation between the center-line and the roughness curve.

(8) Magnetic Disk Manufacturing Step

On each of the opposite surfaces of the glass substrate for a magnetic disk obtained through the above-mentioned steps, a NiAl seed layer, a CrMo underlayer, a CoCrPtTa magnetic layer, and a carbon hydride protection layer were successively deposited by the use of an in-line sputtering apparatus. Furthermore, a perfluoropolyether lubricant layer was formed on each carbon hydride protection layer by a dipping process to obtain a magnetic disk.

The magnetic disk thus obtained was subjected to a gliding test. As a result, hit (light touch of the head with the protrusion on the surface of the magnetic disk) and crash (collision of the head against the protrusion on the surface of the magnetic disk) were not observed. It was confirmed that no defect is produced in a film such as a magnetic layer by the protrusion causing the thermal asperity.

For the magnetic disk of this embodiment after completion of the gliding test, a reproduction test was performed by the use of a magnetoresistive head. For all of a plurality of (500) samples, no reproducing error due to the thermal asperity was observed.

COMPARATIVE EXAMPLE 1

A glass substrate was prepared in a manner similar to the embodiment 1 except that the sulfuric acid cleaning after the polishing step was not performed.

For the glass substrate thus obtained, the surface roughness of the principal surface was measured by the interatomic force microscope (AFM). As a result, Rmax, Ra, and Rq were equal to 11.0 nm, 0.30 nm, and 0.40 nm, respectively. The surface of the glass substrate was thoroughly examined to observe the abnormal protrusion which seems as the polishing residue.

Next, a magnetic disk having a film structure similar to that of the embodiment 1 was prepared and subjected to a glide text and a reproduction test by a magnetoresistive head. As a result, glide defect due to the abnormal protrusion and reproducing error due to the thermal asperity were confirmed.

Embodiment 2

A glass substrate was prepared in a manner similar to the embodiment 1 except that the sulfuric acid cleaning described in the embodiment 1 is preceded by pre-cleaning with 6 wt % sodium hydroxide aqueous solution (50° C., 30 minutes).

For the glass substrate thus obtained, the surface roughness of the principal surface was measured by the interatomic force microscope (AFM). As a result, Rmax, Ra, and Rq were equal to 3.70 nm, 0.27 nm, and 0.35 nm, respectively. The surface of the glass substrate was thoroughly examined to observe no abnormal protrusion causing the thermal asperity.

Then, a magnetic disk having a film structure similar to that of the embodiment 1 was prepared and subjected to a gliding test and a reproduction test by a magnetoresistive head. As a result, glide defect due to the abnormal protrusion or reproduction error due to the thermal asperity was not observed.

Embodiment 3

A glass substrate was prepared in a manner similar to the embodiment 2 except that the second polishing step in the embodiment 1 is followed by a third polishing step. The third polishing step is intended to reduce the surface roughness Ra to a level not greater than 0.3–0.1 nm. The third polishing step was carried out in a polishing condition similar to that of the second polishing step except that the polishing solution was colloidal silica (average grain size: 100 nm)+water, the load was between 25 and 100 g/cm$^2$, the polishing time was between 5 and 20 minutes, and the removed amount was between 1 and 5 μm.

For the glass substrate thus obtained, the surface roughness of the principal surface was measured by the interatomic force microscope (AFM). As a result, Rmax, Ra, and Rq were equal to 2.0 nm, 0.15 nm, and 0.19 nm, respectively. The surface of the glass substrate was thoroughly examined to observe no abnormal protrusion causing the thermal asperity.

Then, a magnetic disk having a film structure similar to that of the embodiment 1 was prepared and subjected to a gliding test and a reproduction test by a magnetoresistive head. As a result, glide defect due to the abnormal protrusion or reproduction error due to the thermal asperity was not observed.

It is preferable to carry out the alkali pre-cleaning prior to the sulfuric acid cleaning as in the embodiments 2 and 3, because the abrasive agent used in the polishing step and adhered to the glass substrate can be dispersed so that the abrasive agent can be efficiently removed by the slow etching effect.

REFERENCE EXAMPLE

A glass substrate was prepared in a manner similar to the embodiment 1 except that cleaning (60° C., 6 minutes) was performed with dilute sulfuric acid having a concentration of 20 vol % instead of concentrated sulfuric acid described in the embodiment 1.

For the glass substrate thus obtained, the surface roughness of the principal surface was measured by the interatomic force microscope (AFM), As a result, Rmax, Ra, and Rq were equal to 10 nm, 0.3 nm, and 0.35 nm, respectively. The surface of the glass substrate was thoroughly examined to observe abnormal protrusion which seems as polishing residue.

Then, a magnetic disk having a film structure similar to that of the embodiment 1 was prepared and subjected to a gliding test and a reproduction test by a magnetoresistive head. As a result, glide defect due to the abnormal protrusion and reproduction error due to the thermal asperity were confirmed.

Embodiments 4–6

A glass substrate was prepared in a manner similar to the embodiment 1 except that the condition of the sulfuric acid cleaning described in the embodiment 1 was changed so that the density was 75 vol % (60° C.) (embodiment 4), 60 vol % (12° C.) (embodiment s), and 25 vol % (110° C.) (embodiment 6).

For the glass substrate thus obtained, the surface roughness of the principal surface was measured by the interatomic force microscope (AFM). As a result, Rmax=2.95 nm, Ra=0.24 nm, and Rq=0.31 nm in the embodiment 4. Rmax=4.51 nm, Ra=0.40 nm, and Rq=0.49 nm in the embodiment 5. Rmax=5.83 nm, Ra=0.58 nm, and Rq=0.71 nm in the embodiment 6. The surface of the glass substrate was thoroughly examined to observe no abnormal protrusion causing the thermal asperity.

Then, a magnetic disk having a film structure similar to that of the embodiment 1 was prepared and subjected to a gliding test and a reproduction test by a magnetoresistive head. As a result, glide defect due to the abnormal protrusion or reproduction error due to the thermal asperity was not observed.

Embodiments 7–9

A glass substrate and a magnetic disk were prepared in a manner similar to the embodiment 1 except that a soda-lime glass (embodiment 7), an aluminoborosilicate glass (embodiment 8), and a crystallized glass (embodiment 9) were used instead of the aluminosilicate glass used in the embodiment 1.

As a result, the surface roughness of the glass substrate was equivalent to that of the embodiment 1. The abnormal protrusion causing the thermal asperity was not observed. In a gliding test and a reproduction test by a magnetoresistive head for the magnetic disk, glide defect due to the abnormal protrusion or the reproduction error due to the thermal asperity was not observed.

Although this invention has been described in conjunction with the preferred embodiments, this invention is not restricted to the foregoing embodiments.

For example, the sulfuric acid cleaning of this invention is not restricted to the cleaning after a final polishing step such as the above-mentioned second or third polishing step intended to reduce the surface roughness but may be used as cleaning after the first polishing step intended to remove scratches and distortions left by the lapping step or after the lapping step and the end face polishing step intended to improve the dimensional accuracy and the shape accuracy of the substrate.

As described above, according to this invention, it is possible to obtain the glass substrate for an information recording medium without the polishing residue left on the glass substrate. If the information recording layer is formed on the glass substrate for an information recording medium, the information recording medium free from the film defect is obtained.

Particularly in the magnetic recording medium, it is possible to realize a low flying height without head crash. Furthermore, in case of the magnetic recording medium for which electromagnetic conversion is performed by the magnetoresistive head, it is possible to avoid degradation of the reproducing function due to the thermal asperity because of absence of the protrusion causing the thermal asperity.

In addition, it is possible to avoid product defect resulting from the protrusion causing the thermal asperity and to obtain a higher-quality magnetic recording medium at a high yield.

What is claimed is:

1. A method of manufacturing a glass substrate for an information recording medium, comprising:
    a polishing step of polishing a principal surface of said glass substrate;
    a sulfuric acid-cleaning step of cleaning, after said polishing step, at least said principal surface with sulfuric acid, said sulfuric acid-cleaning step being carried out in order to remove abrasion residue left as a result of said polishing step; and
    a chemical strengthening step of strengthening, after said sulfuric acid-cleaning step, said glass substrate by replacing a part of ions contained in said glass substrate by substitute ions greater in ion-diameter than said part of ions.

2. A method as claimed in claim 1, further comprising a pre-cleaning step of pre-cleaning at least said principal surface with alkali before said sulfuric acid-cleaning step.

3. A method as claimed in claim 1, wherein said polishing step is for polishing said principal surface by using abrasive grains made of cerium oxide.

4. A method as claimed in claim 1, wherein said polishing step is for polishing said principal surface so that said glass substrate has a surface roughness Ra not greater than 1.0–0.1 nm, where Ra is representative of a center-line-mean roughness.

5. A method as claimed in claim 1, wherein said sulfuric acid-cleaning step is for cleaning at least said principal surface with the sulfuric acid which has a concentration of 25 vol % or more.

6. A method as claimed in claim 1, wherein said glass substrate for the information recording medium is a glass substrate for a magnetic disk.

7. A method as claimed in claim 6, wherein said glass substrate for the information recording medium is the glass substrate for the magnetic disk which is adapted to a magneto-resistive head.

8. A method of manufacturing an information recording medium, comprising the step of forming at least a recording layer on said glass substrate for the information recording medium that is manufactured by the method as claimed in claim 1.

9. A method as claimed in claim 8, wherein said recording layer is a magnetic layer.

10. A method of manufacturing a glass substrate for an information recording medium, comprising the steps of:
    polishing a principal surface of said glass substrate;
    cleaning at least said principal surface with an alkaline cleaning solution subsequent to said step of polishing said principal surface; and
    cleaning at least said principal surface with sulfuric acid subsequent to said step of cleaning at least said principal surface with said alkaline cleaning solution;
    said step of cleaning at least said principal surface with said sulfuric acid being carried out in order to remove abrasion residue left as a result of said step of polishing said principal surface.

11. A method as claimed in claim 10, wherein said step of polishing said principal surface uses abrasive grains made of cerium oxide.

12. A method as claimed in claim 10, further comprising a chemical strengthening step of strengthening, after said step of cleaning at least said principal surface with said sulfuric acid, said glass substrate by replacing a part of ions contained in said glass substrate by substitute ions greater in ion-diameter than said part of ions.

13. A method as claimed in claim 10, wherein said step of polishing said principal surface is carried out so that said glass substrate has a surface roughness Ra not greater tan 1.0–0.1 nm, where Ra is representative of a center-line-mean roughness.

14. A method as claimed in claim 10, wherein said sulfuric acid has a concentration of 25 vol % or more.

15. A method as claimed in claim 10, wherein said glass substrate for the information recording medium is a glass substrate for a magnetic disk.

16. A method as claimed in claim 15, wherein said glass substrate for the information recording medium is the glass substrate for the magnetic disk which is adapted to a magneto-resistive head.

17. A method of manufacturing an information recording medium, comprising the step of forming at least a recording layer on said glass substrate for the information recording medium that is manufactured by the method as claimed in claim 10.

18. A method as claimed in claim 17, wherein said recording layer is a magnetic layer.

* * * * *